(12) United States Patent
Siebens et al.

(10) Patent No.: US 9,472,868 B2
(45) Date of Patent: Oct. 18, 2016

(54) PERMANENT GROUND POINT FOR SPLICING CONNECTORS

(71) Applicant: Thomas & Betts International LLC, Wilmington, DE (US)

(72) Inventors: Larry N. Siebens, Asbury, NJ (US); Carlos H. Hernandez, Germantown, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 183 days.

(21) Appl. No.: 14/483,958

(22) Filed: Sep. 11, 2014

(65) Prior Publication Data

US 2015/0087171 A1    Mar. 26, 2015

Related U.S. Application Data

(60) Provisional application No. 61/882,293, filed on Sep. 25, 2013.

(51) Int. Cl.

| | |
|---|---|
| H01R 4/64 | (2006.01) |
| H01R 4/66 | (2006.01) |
| H01R 13/648 | (2006.01) |
| H01R 4/18 | (2006.01) |
| H01R 4/56 | (2006.01) |
| H01R 13/447 | (2006.01) |
| H01R 31/02 | (2006.01) |
| H01R 43/26 | (2006.01) |

(52) U.S. Cl.
CPC ........ *H01R 4/66* (2013.01); *H01R 4/18* (2013.01); *H01R 4/56* (2013.01); *H01R 4/646* (2013.01); *H01R 13/447* (2013.01); *H01R 13/648* (2013.01); *H01R 31/02* (2013.01); *H01R 43/26* (2013.01)

(58) Field of Classification Search
CPC .................................................... Y10S 439/821
USPC .......................... 439/108, 921, 912, 92, 149
See application file for complete search history.

(56) References Cited

U.S. PATENT DOCUMENTS

| | | | |
|---|---|---|---|
| 1,902,617 A | | 3/1933 | Burr |
| 2,937,359 A | | 5/1960 | Cronin et al. |
| 2,941,834 A | | 6/1960 | Appleton et al. |
| 3,343,153 A | | 9/1967 | Waehner |
| 3,363,171 A | | 1/1968 | Sietmann et al. |
| 3,390,331 A | | 6/1968 | Brown et al. |
| 3,740,700 A | * | 6/1973 | Robertson ............... H01F 27/04 174/73.1 |
| 3,835,439 A | | 9/1974 | Yonkers |
| 3,853,375 A | | 12/1974 | McClain |
| 3,883,208 A | | 5/1975 | Sankey et al. |
| 3,915,534 A | | 10/1975 | Yonkers |
| 3,924,919 A | | 12/1975 | McClain |

(Continued)

FOREIGN PATENT DOCUMENTS

| | | |
|---|---|---|
| CA | 2571779 | 2/2010 |
| CA | 2541647 | 3/2014 |

(Continued)

*Primary Examiner* — Neil Abrams
(74) *Attorney, Agent, or Firm* — Hoffmann & Baron, LLP

(57) ABSTRACT

A permanent ground point for a splicing connector is provided. The ground point is comprised of a ground rod that is permanently attached to a port on the splicing connector. A grounding clamp may then be attached to the ground point after the system is de-energized in order to provide a safe connection to system ground.

20 Claims, 7 Drawing Sheets

(56) References Cited

U.S. PATENT DOCUMENTS

| | | | |
|---|---|---|---|
| 3,959,869 A | 6/1976 | Wyman et al. | |
| 3,980,374 A * | 9/1976 | Fallot | H01R 13/53 174/72 R |
| 4,152,643 A | 5/1979 | Schweitzer | |
| 4,202,591 A | 5/1980 | Borgstrom | |
| 4,272,798 A | 6/1981 | Merola | |
| 4,660,909 A | 4/1987 | Wilson | |
| 4,744,765 A * | 5/1988 | DeLeo | H01R 4/64 174/138 F |
| 4,760,327 A | 7/1988 | Walsh et al. | |
| 4,787,855 A | 11/1988 | Finke | |
| 4,794,331 A | 12/1988 | Schweitzer | |
| 4,799,895 A | 1/1989 | Borgstrom | |
| 4,822,289 A | 4/1989 | DeLeo | |
| 4,859,192 A * | 8/1989 | DeLeo | H01R 13/53 439/796 |
| 4,865,559 A | 9/1989 | Clabburn | |
| 4,904,932 A | 2/1990 | Schweitzer | |
| 4,946,393 A | 8/1990 | Borgstrom et al. | |
| 5,114,357 A | 5/1992 | Luzzi | |
| 5,131,855 A * | 7/1992 | Pickering | H01R 4/70 439/521 |
| 5,149,281 A * | 9/1992 | Hills | G01R 1/04 439/521 |
| 5,367,251 A | 11/1994 | McTigue | |
| 5,440,235 A * | 8/1995 | Oko | H01R 13/443 174/138 F |
| 5,450,280 A | 9/1995 | Wactor | |
| 6,075,209 A | 6/2000 | Luzzi | |
| 6,210,206 B1 | 4/2001 | Durham | |
| 6,332,785 B1 | 12/2001 | Muench, Jr. et al. | |
| 6,843,685 B1 | 1/2005 | Borgstrom et al. | |
| 7,150,098 B2 | 12/2006 | Borgstrom et al. | |
| 7,154,281 B2 | 12/2006 | Piesinger | |
| 7,173,187 B2 | 2/2007 | Triantopoulos et al. | |
| 7,288,718 B2 | 10/2007 | Stepniak et al. | |
| 7,470,131 B2 | 12/2008 | Hughes | |
| 7,503,785 B2 * | 3/2009 | Stepniak | G01R 15/16 439/187 |
| 7,695,291 B2 * | 4/2010 | Hughes | G01R 31/07 439/181 |
| 7,708,576 B2 | 5/2010 | Hughes et al. | |
| 7,883,356 B2 | 2/2011 | Hughes et al. | |
| 7,901,227 B2 | 3/2011 | Hughes | |
| 7,901,243 B1 | 3/2011 | Yaworski | |
| 7,909,635 B2 | 3/2011 | Hughes et al. | |
| RE42,331 E | 5/2011 | Carpenter, Jr. et al. | |
| 7,942,679 B1 | 5/2011 | Gretz | |
| 7,946,870 B2 | 5/2011 | Hughes et al. | |
| 8,172,596 B2 | 5/2012 | Siebens | |
| 8,368,405 B2 | 2/2013 | Siebens | |
| 8,408,925 B2 * | 4/2013 | Borgstrom | H01R 3/00 439/181 |
| 8,454,376 B1 | 6/2013 | Siebens | |
| 8,597,040 B2 * | 12/2013 | Siebens | G01R 1/0416 439/301 |
| 8,616,908 B2 | 12/2013 | Siebens | |
| 8,882,548 B2 * | 11/2014 | Siebens | H01R 4/5008 439/864 |
| 9,059,581 B2 * | 6/2015 | Luzzi | H02G 15/1833 |
| 9,124,015 B2 * | 9/2015 | Siebens | H01R 13/40 |
| 9,124,050 B2 * | 9/2015 | Siebens | H01R 13/53 |
| 2014/0024241 A1 | 1/2014 | Siebens | |
| 2014/0065867 A1 | 3/2014 | Siebens | |
| 2015/0087171 A1* | 3/2015 | Siebens | H01R 4/646 439/108 |

FOREIGN PATENT DOCUMENTS

| | | |
|---|---|---|
| JP | S63159271 | 10/1988 |
| JP | 2000299908 | 10/2000 |

* cited by examiner

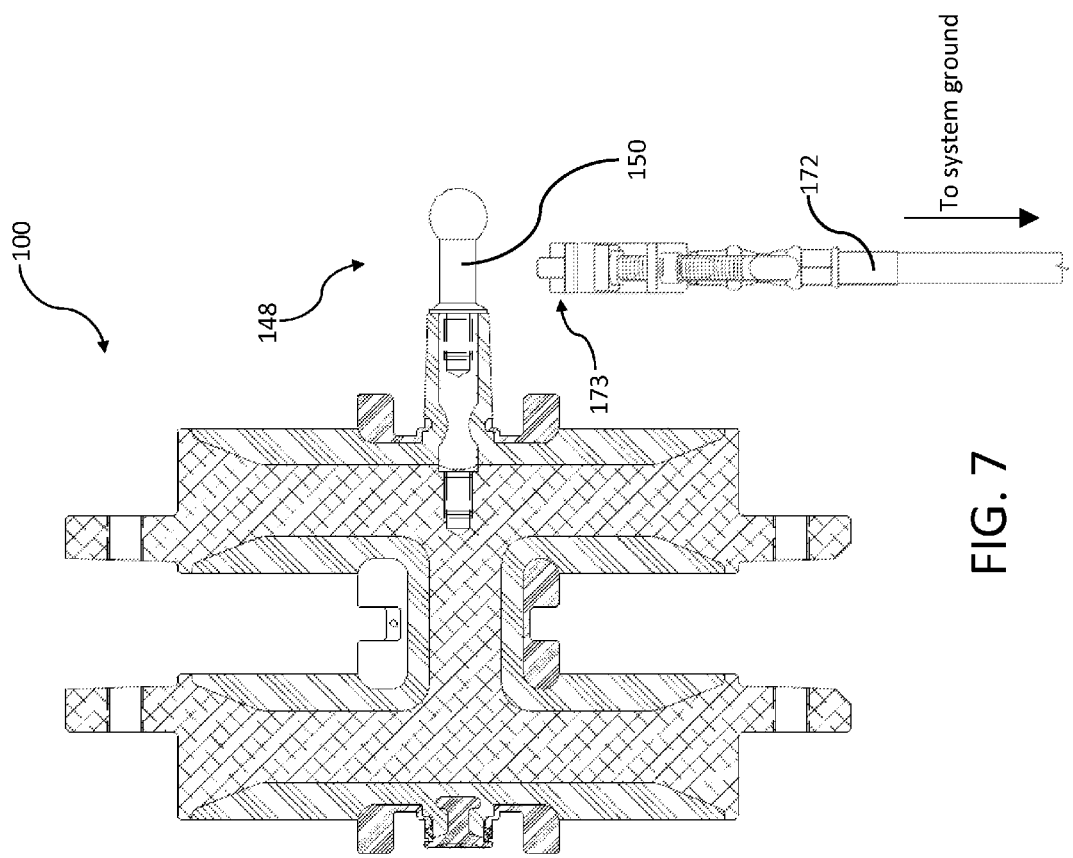

PERMANENT GROUND POINT FOR SPLICING CONNECTORS

CROSS-REFERENCE TO RELATED APPLICATION

This application claims priority under 35 U.S.C. §119, based on U.S. Provisional Patent Application No. 61/882, 293, filed on Sep. 25, 2013, the disclosure of which is hereby incorporated by reference herein.

FIELD OF THE INVENTION

In general, the present invention relates to a permanent ground point for electrical cable connectors, such as splicing connectors for joining two or more electrical cables. More particularly, aspects described herein relate to a ground rod that is permanently attached to a port of the splicing connector.

BACKGROUND

Medium and high voltage electrical cable connectors which typically operate in the 15 to 35 kilovolt (kV) range, and which include connectors such as "I", "Y" and "H" splicing connectors, must be connected to system ground after being de-energized in order to be safely serviced. In currently used splicing connectors, one leg of the spliced connection must first be disconnected, and then a grounding device, such as a ground clamp, can be attached in order to connect the splice to system ground. Because this requires partially disassembling the splice, it is a time consuming practice.

SUMMARY OF THE INVENTION

The present invention provides a permanent ground point for medium and high voltage electrical cable connectors, such as "I", "Y" and "H" splicing connectors. This permanent ground point is permanently attached to a port on the splicing connector so that it is convenient for a worker servicing the splicing connector to attach a grounding clamp to the ground point of the connector so that it can easily be connected to system ground without the need for disconnecting a leg of the splice.

BRIEF DESCRIPTION OF THE DRAWINGS

FIG. 7 is a cross-sectional side elevation view of a permanent ground point of a splicing cable connector of the present invention without receptacles shown and with a bar type grounding clamp for grounding the connector.

DETAILED DESCRIPTION OF THE PREFERRED EMBODIMENT(S)

Figure 1:
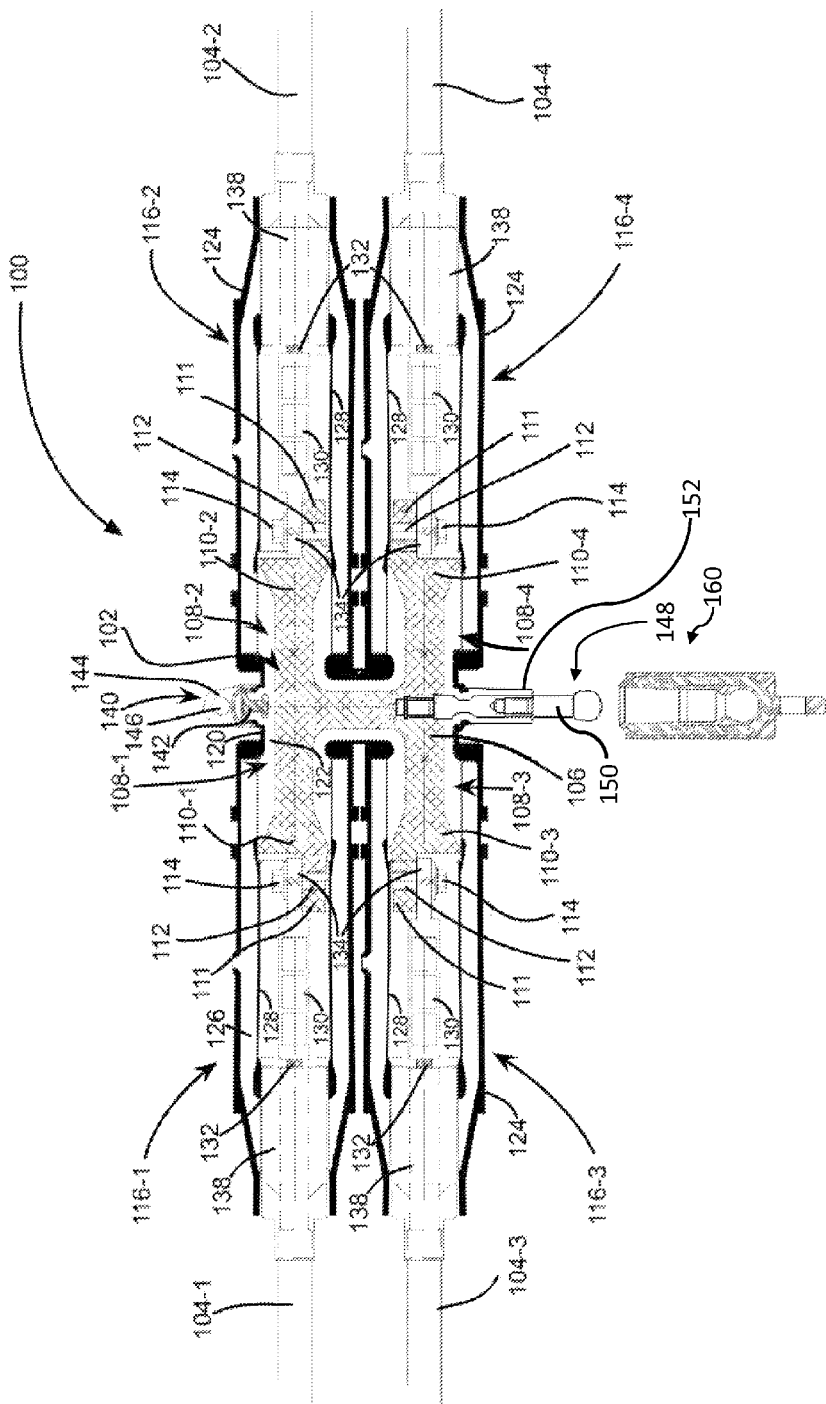
FIG. 1 is a cross-sectional side view of a completely assembled splicing cable connector with a permanent ground point of the present invention with a molded cover cap for the ground point that is removed from the ground point.

The above and other features, aspects and advantages of the present invention will now be discussed in the following detailed description of preferred embodiments and appended claims, which are to be considered in conjunction with the accompanying drawings in which identical reference characters designate like elements throughout the views.

Shown in FIG. 1 is a cross-sectional diagram illustrating a power cable splicing connector 100 configured in a manner consistent with the implementations described herein. As shown in FIG. 1, power cable splicing connector 100 may include a four-way yoke 102 for enabling connection of power cables 104-1, 104-2, 104-3 and 104-4 (collectively "power cables 104," and individually "power cable 104-$x$"). For example, power cable 104-1 may be a supply cable and cables 104-2 to 104-4 may be load cables. Other types of power cable splicing connectors may be configured in accordance with implementations described herein, such as three-way yoke connectors, two-way yoke connectors, etc.

In one implementation, yoke 102 of power cable splicing connector 100 may include a central conductor 106 and a number of splice openings 108-1 to 108-4 (collectively "splice openings 108," and individually "splice opening 108-$x$"). Central conductor 106 may be formed of a suitably conductive material, such as copper, aluminum or other conductive alloy. Further, as shown in FIG. 1, central conductor 106 may include outwardly extending portions 110-1 to 110-4 (collectively "outwardly extending portions 110," and individually "outwardly extending portion 110-$x$") that project from respective splice openings 108-$x$. As described in additional detail below, central conductor 106 may connect each of power cables 104-$x$ to each other power cable 104-$x$, such that voltage applied to one cable is transferred to each other cable.

Outwardly extending portions 110 may be configured to receive connector portions of power cables 104. For example, each extending portion 110-$x$ may include a spade portion 111 having a threaded bore 112 therein for receiving a connector bolt 114. In one configuration, as illustrated in FIG. 1, outwardly extending portion 110-1 extends oppositely from outwardly extending portion 110-2 and outwardly extending portion 110-3 extends oppositely from outwardly extending portion 110-4. Furthermore, outwardly extending portions 110-1 and 110-2 may be oriented parallel to outwardly extending portions 110-3 and 110-4, respectively. Such a configuration may provide for compact splicing or splitting of a power cable supply cable (e.g., cable 104-1) to multiple load cables (e.g., cables 104-2 to 104-4).

As shown in FIG. 1, each splice opening 108-$x$ includes a cable receptacle interface that includes a substantially cylindrical flange or cuff portion configured to frictionally engage a cable receptacle 116-$x$ (individually, cable receptacle 116-*x*, or collectively, cable receptacles 116). For example, an inside diameter of a forward end of cable receptacle 116-*x* may be sized to frictionally engage the cuff portion of splice opening 108-*x*. Each cable receptacle 116-*x* may be substantially cylindrical and may be configured to surround and protect an interface between power cables 104 and extending portions 110.

Yoke 102 may include an outer shield 120 formed from, for example, a peroxide-cured synthetic rubber, commonly referred to as EPDM (ethylene-propylene-diene monomer). Within shield 120, yoke 102 may included an insulative inner housing 122, typically molded from an insulative rubber or epoxy material. Central conductor 106 may be enclosed within insulative inner housing 122.

Regarding cable receptacles 116, each cable receptacle 116-*x* may include an EPDM outer shield 124 and an insulative inner housing 126, typically molded from an insulative rubber or epoxy material. Cable receptacle 116-*x* further includes a conductive or semi-conductive insert 128 having a bore there through. Upon assembly, cable receptacle 116-*x* surrounds the interface between power cable 104-*x* and outwardly extending portion 110-*x*. In one implementation, a forward end of insert 128 may be configured to frictionally engage outwardly extending portion 110-*x* of central conductor 106 upon assembly of splicing connector 100, thereby ensuring the electrical integrity of splicing connector 100.

Referring to power cables 104, a forward end of each power cable 104-*x* may be prepared by connecting power cable 104-*x* to a crimp connector 130. Crimp connector 130 may include a substantially cylindrical assembly configured to receive a cable conductor 132 of power cable 104-*x* therein. During preparing of power cable 104-*x*, a portion of crimp connector 130 may be physically deformed (e.g., crimped) to fasten crimp connector 130 to cable conductor 132. Crimp connector portion 130 may include a forward spade portion 134 configured to be securely fastened to the spade portion 111 of outwardly extending portion 110-*x* of central conductor 106. For example, forward spade portion 134 may include a bore (not shown) configured to align with bore 112 in spade portion 111. Connector bolt 114 may be inserted through the bore and into threaded bore 112 during assembly of splice connector 100.

As shown in FIG. 1, each of the prepared power cables 104 may further include an adapter 138 disposed rearwardly relative to crimp connector 130. Adapter 138 may be affixed to power cable 104-*x* and may provide a frictional engagement with a rearward portion of cable receptacle 116-*x*. In one implementation, adapter 138 may be formed of an insulative material, such as rubber or epoxy.

In one exemplary implementation, power cable splicing connector 100 may include a voltage detection test point assembly 140 for sensing a voltage in splicing connector 100. Voltage detection test point assembly 140 may be configured to allow an external voltage detection device (not shown), to detect and/or measure a voltage associated with splicing connector 100.

For example, as illustrated in FIG. 1, voltage detection test point assembly 140 may include a test point terminal 142 embedded in a portion of yoke inner housing 122 and extending through an opening within yoke outer shield 120. In one exemplary embodiment, test point terminal 142 may be formed of a conductive metal or other conductive material. In this manner, test point terminal 142 may be capacitively coupled to the electrical conductor elements (e.g., central conductor 106) within splicing connector 100.

Consistent with implementations described herein, a test point cap 144 may sealingly engage test point terminal 142 and outer shield 120. In one implementation, test point cap 144 may be formed of a semi conductive material, such as EPDM compounded with conductive additives. When the test point terminal 142 is not being accessed, test point cap 144 may be mounted on test point assembly 140. Because test point cap 144 is formed of a conductive or semi conductive material, test point cap 144 may ground the test point when in position. Test point cap 144 may include an aperture 146 for facilitating removal of test point cap 144, e.g., using a hooked lineman's tool (not shown), which is referred to in the industry as a "hot stick."

Consistent with implementations described herein, yoke 102 may include a permanent ground point 148 projecting there-from. As shown in FIG. 1, permanent ground point 148 is comprised of a ground rod 150 which extends from a port 152. Portions of insulative inner housing 122 and outer housing 120 may be formed around the port 152 of the permanent ground point 148. In one implementation, permanent ground point 148 may project substantially perpendicularly from outwardly extending portions 110, so as to be relatively free of encumbrances.

When it is necessary for work to be performed on any of the power cables 104 (or devices connected to power cables 104) and after the system has been de-energized, a worker may connect a grounding device, such as a grounding clamp 170 or 172 (shown in FIGS. 6 and 7), to ground rod 150 of permanent ground point 148 to ensure that the power cable splicing connector 100 is properly connected to system ground so that it may be safely serviced. When a worker is finished with their work on the power cable splicing connector 100, a ground rod cap 160 (to be described in detail below) may fully receive the permanent ground point 148 to fully cover the ground point 148 and ground rod 150. With the ground rod cap 160 installed, the system may be safely energized once more.

Figure 2:
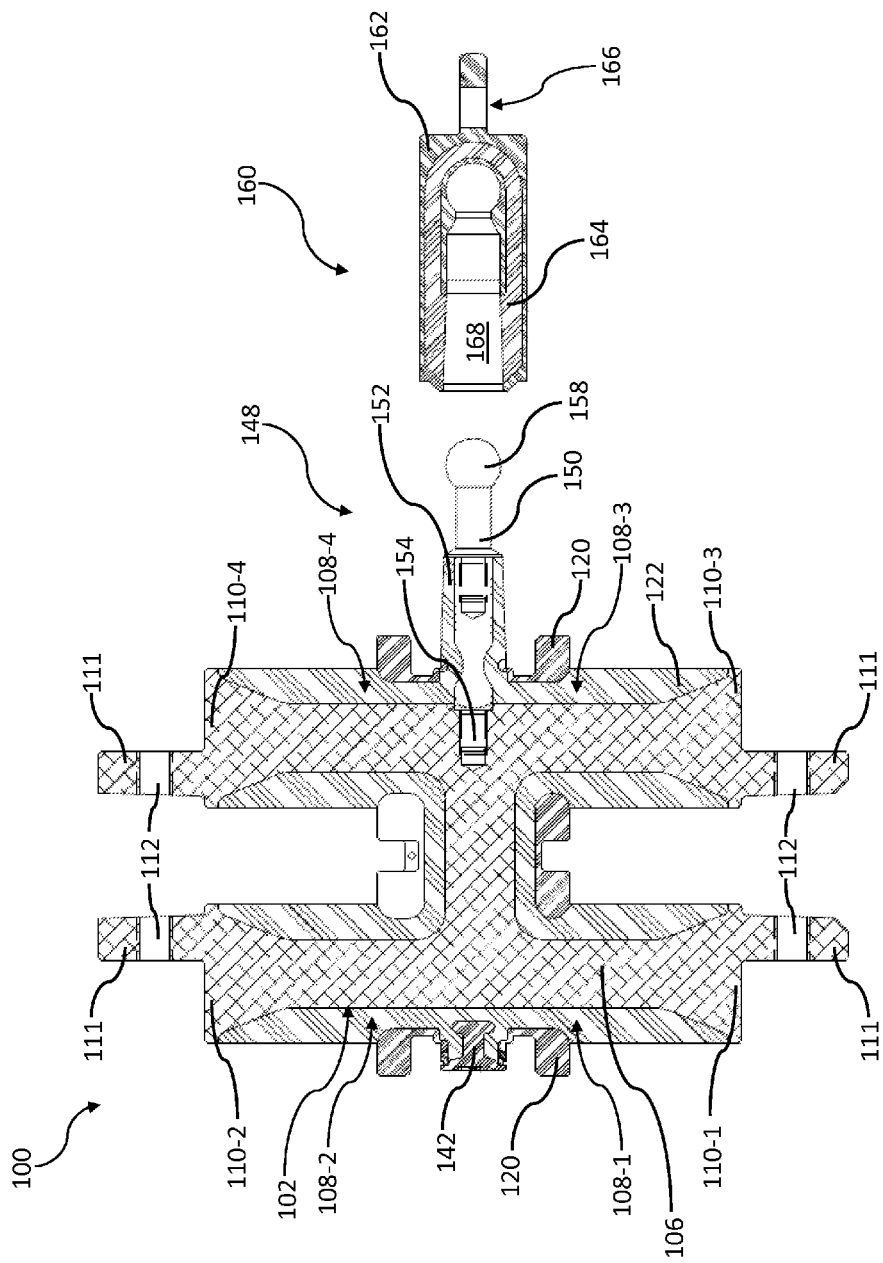
FIG. 2 is a cross-sectional side elevation view of a permanent ground point of a splicing cable connector of the present invention without receptacles shown and with a molded cover cap for the ground point that is removed from the ground point.
Figure 3:
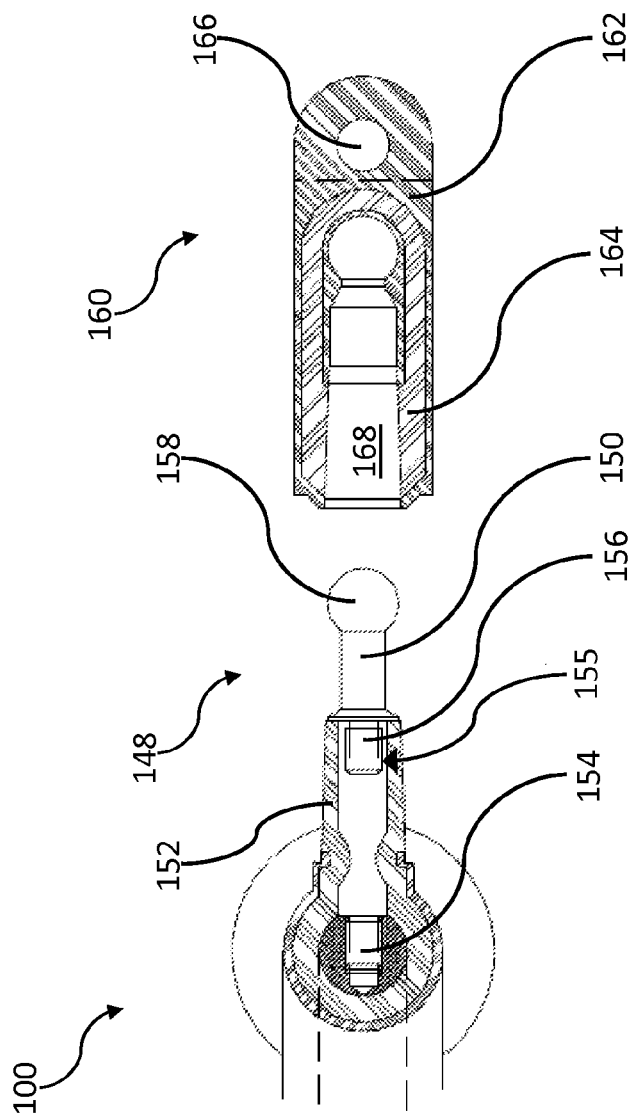
FIG. 3 is a cross-sectional plan view of a permanent ground point of a splicing cable connector of the present invention with a molded cover cap for the ground point that is removed from the ground point.

FIG. 2 is a cross-sectional side elevation view of a permanent ground point 148 of a power cable splicing connector 100. In FIG. 2, the cable receptacles 116 described previously, and shown in FIG. 1, are not shown, nor are the parts of the splicing connector 100 which are housed by the cable receptacles 116. FIG. 2 shows the permanent ground point 148, which is comprised of ground rod 150 and port 152. Ground rod cap 160 is also shown which can be installed on the permanent ground point 148 in order for the system to be safely energized. In one implementation shown in FIG. 2, port 152 may be integrally formed with inner housing 122, such that it is mechanically and electrically secured thereto, and may include a contact 154 provided therein. Contact 154 may extend into a corresponding portion of central conductor 106, such as via a threaded bore provided in central conductor 106. Contact 154 may include a female thread 155, shown in FIG. 3, at an outer end thereof for receiving a threaded male protrusion 156 of the ground rod 150, as shown in FIG. 3, to keep the ground rod 150 connected to the contact 154 within port 152 of the splicing connector 100 in order to form permanent ground point 148. This arrangement allows for the ground rod 150 to be conductively connected to central conductor 106 of yoke 102, which in turn allows for the splicing connector 100 and any attached cables to be connected to system ground when the ground rod 150 is connected to a grounding device, such as a grounding clamp, that is properly connected to system ground.

FIGS. 2 and 3 show in larger detail the previously mentioned ground rod cap 160. FIG. 2 illustrates a cross-sectional side elevation view while FIG. 3 illustrates a cross-sectional plan view of the permanent ground point 148 and ground rod cap 160 of the splicing connector 100. As shown in both of these figures, ground rod cap 160 may include an EPDM outer shield 162 and an insulative inner housing 164, typically molded from an insulative rubber or epoxy material. Ground rod cap 160 includes cavity 168 for engaging with permanent ground point 148 to fully cover the port 152 and ground rod 150. It can also be seen from FIGS. 2 and 3 that ground rod 150 is comprised of a rounded ball end 158. The cavity 168 of ground rod cap 160 is shaped to the contour of the ground rod 150 and the rounded ball end 158. Furthermore, ground rod cap 160 is comprised of an aperture 166 at an outer end of the cap 160. The aperture 166 is included for facilitating removal of the ground rod cap 160 from the permanent ground point 148 using, for example, a hot stick (not shown).

Figure 4:
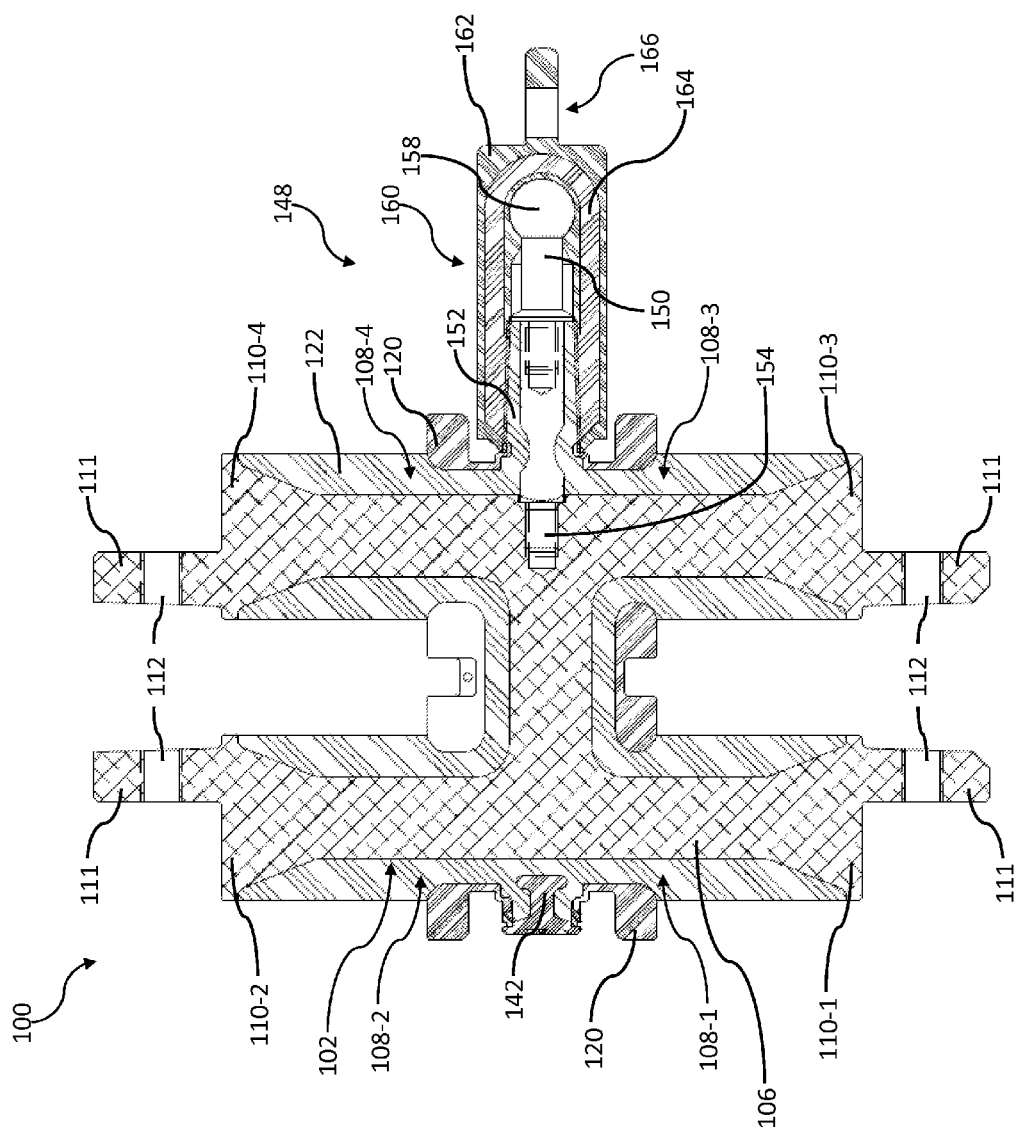
FIG. 4 is a cross-sectional side elevation view of a permanent ground point of a splicing cable connector of the present invention without receptacles shown and with a molded cover cap installed on the ground point.
Figure 5:
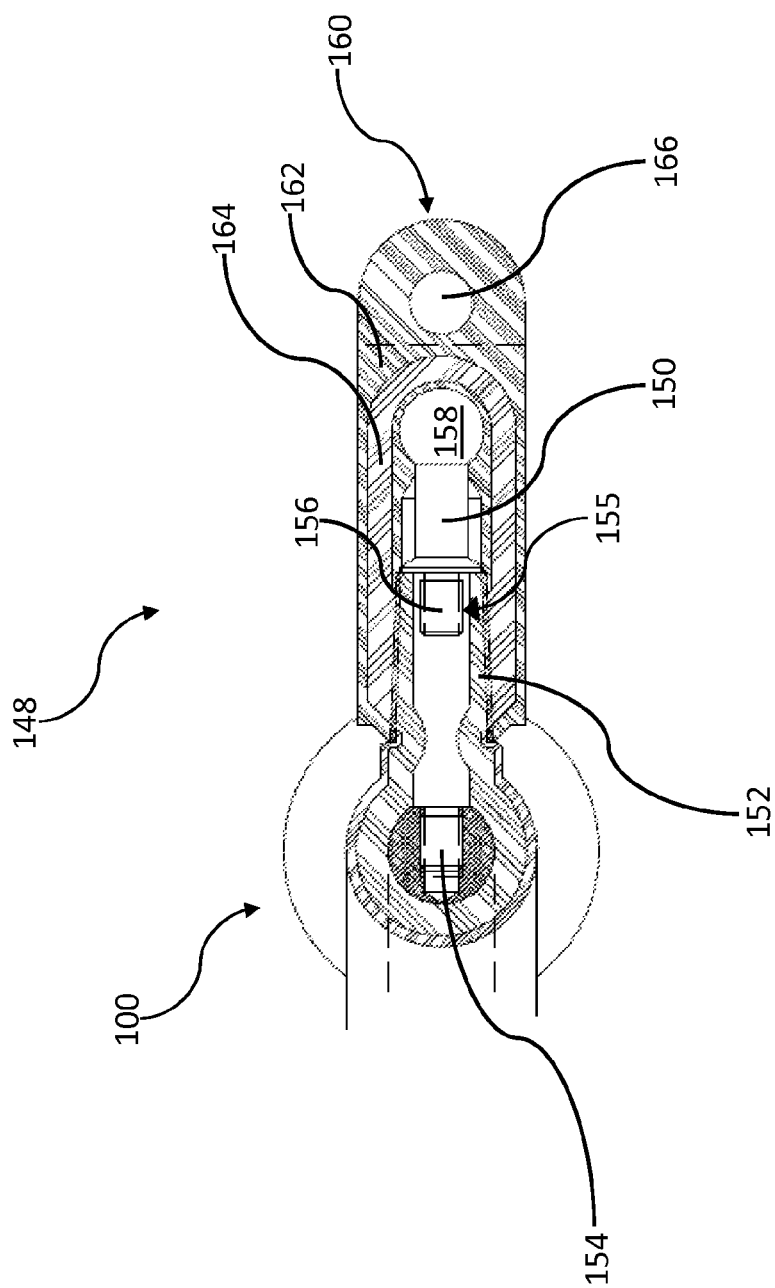
FIG. 5 is a cross-sectional plan view of a permanent ground point of a splicing cable connector of the present invention with a molded cover cap installed on the ground point.

FIGS. 4 and 5 illustrate the same implementations as described in FIGS. 2 and 3, respectively, but in FIGS. 4 and 5 the ground rod cap 160 is shown installed on permanent ground point 148 such that it fully encloses the port 152 and ground rod 150. With the ground rod cap 160 installed on permanent ground point 148, as shown in FIGS. 4 and 5, the system of the splicing connector 100 may be safely energized. In FIGS. 4 and 5, it can be seen that the cavity 168 of the ground rod cap 160 (as shown in FIGS. 2 and 3) is sized such that it is completely seated over the entire ground point 148 and the implementations which it comprises.

Figure 6:
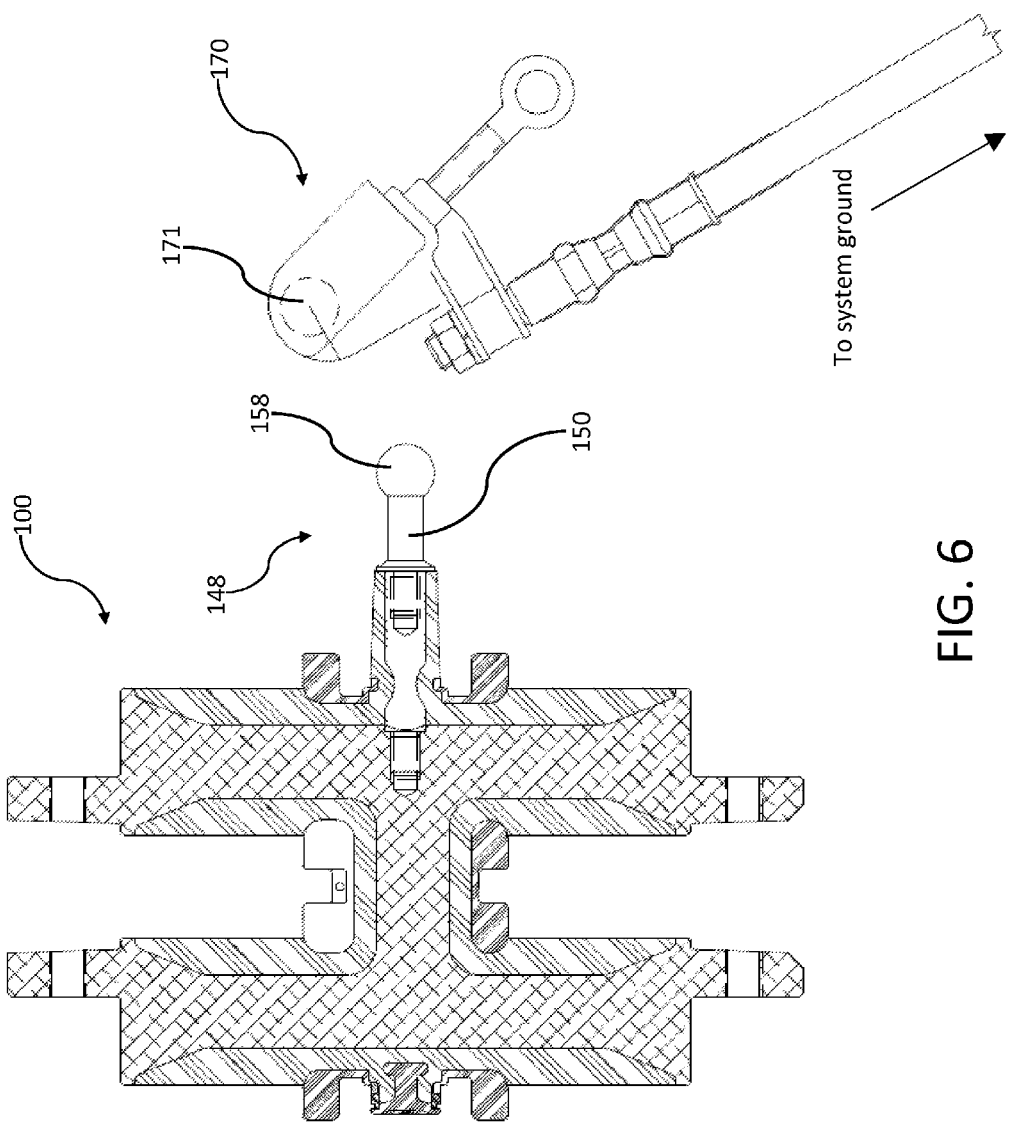
FIG. 6 is a cross-sectional side elevation view of a permanent ground point of a splicing cable connector of the present invention without receptacles shown and with a ball type grounding clamp for grounding the connector.

Finally, shown in FIGS. 6 and 7 are two types of grounding devices which can be attached to ground rod 150 of permanent ground point 148 in order to connect splicing connector 100 and any attached cables to system ground. Similarly to FIGS. 2-5, in FIGS. 6 and 7 the cable receptacles 116 described previously, and shown in FIG. 1, are not shown, nor are the parts of the splicing connector 100 which are housed by the cable receptacles 116. In FIGS. 6 and 7 the ground rod cap 160 has been removed from the permanent ground point 148. It is assumed that before the ground rod cap 160 was removed the entire system was de-energized so that a worker could safely service the splicing connector 100. With the ground rod cap 160 removed from ground point 148, the ground rod 150 is exposed so that a grounding device may be electrically and mechanically connected to it in order to ground the system.

In FIGS. 6 and 7, two different grounding devices are shown. In FIG. 6 a ball type grounding clamp 170 is shown, and in FIG. 7 a rod type grounding clamp 172 is shown. In FIG. 6, the ball type grounding clamp 170 is shown to have a receiving recess 171 which accepts the ball end 158 of ground rod 150 in order to attach to the ground rod 150. In FIG. 7, the rod type ground clamp 172 attaches to ground rod 150 at an end portion 173 of ground clamp 172. In both implementations, the ground clamp 170 or 172 is connected to system ground in order to ground splicing connector 100 and any attached cables once the ground clamp 170 or 172 is attached to ground rod 150. Though ground clamps 170 and 172 are the only two grounding devices shown, it is understood that other types of grounding devices may be available to attach to ground rod 150 in order to connect splicing connector 100 to system ground.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. An electrical connector assembly, comprising:
   a yoke, which is comprised of an outer housing and a central conductor provided within the outer housing, wherein the central conductor comprises at least three outwardly extending portions;
   a first outwardly extending portion and a second outwardly extending portion of the central conductor which are operatively coupled to first and second power cables, respectively; and
   a third outwardly extending portion of the central conductor comprised of a permanent ground point that is mechanically and electrically connected to the central conductor and allows for the entire connector assembly to be grounded when a grounding device connected to system ground is attached to the permanent ground point.

2. The electrical connector assembly of claim 1, wherein the yoke comprises a two-way yoke, a three-way yoke, or a four-way yoke.

3. The electrical connector assembly of claim 1, wherein each of the first outwardly extending portion and the second outwardly extending portion further comprise a spade portion for connecting to the first and second power cables, respectively.

4. The electrical connector assembly of claim 3, further comprising first and second crimp connectors coupled to the first and second power cables, respectively, and wherein the first and second crimp connectors are configured for securing to the spade portions of the first and second outwardly extending portions, respectively.

5. The electrical connector assembly of claim 1, further comprising a first cable receptacle for providing an interface between the first outwardly extending portion and the first power cable, and a second cable receptacle for providing an interface between the second outwardly extending portion and the second power cable, wherein the first and second cable receptacles are configured for engagement with the outer housing of the yoke.

6. The electrical connector assembly of claim 1, wherein the permanent ground point further comprises a port that is integrally formed with the outer housing of the yoke, a contact which is seated within the port and which extends into and electrically connects to a portion of the central conductor, and a ground rod which is electrically mated with the contact of the port and which extends outwardly from the outer housing of the yoke for attachment to a grounding device.

7. The electrical connector assembly of claim 6, wherein the ground rod is mated with the contact of the port by way of a female thread of the contact and a corresponding threaded male protrusion of the ground rod.

8. The electrical connector assembly of claim 6, wherein the ground rod further comprises a rounded ball end on the outwardly extending portion of the ground rod which extends from the outer housing of the yoke for attachment to a ball type grounding clamp.

9. The electrical connector assembly of claim 6, wherein the grounding device used for attachment to the ground rod is a bar type grounding clamp.

10. The electrical connector assembly of claim 1, wherein the permanent ground point further comprises a removable ground rod cap which is shaped to precisely fit over the permanent ground point to fully cover the permanent ground point when the electrical connector assembly and connected power cables are energized and which can be removed from the permanent ground point when the electrical connector assembly and connected power cables need to be grounded and serviced.

11. An electrical connector assembly, comprising:
a yoke, which is comprised of an outer housing and a central conductor provided within the outer housing, wherein the central conductor comprises at least three outwardly extending portions;
a first outwardly extending portion and a second outwardly extending portion of the central conductor which are operatively coupled to first and second power cables, respectively; a third outwardly extending portion of the central conductor comprised of a permanent ground point that is electrically and mechanically connected to the central conductor and allows for the entire connector assembly to be grounded when a grounding device connected to system ground is attached to the permanent ground point; and
wherein the permanent ground point further comprises a port that is integrally formed with the outer housing of the yoke, a contact which is seated within the port and which extends into and electrically connects to a portion of the central conductor, and a ground rod which is electrically mated with the contact of the port and which extends outwardly from the outer housing of the yoke for attachment to a grounding device.

12. The electrical connector assembly of claim 11, wherein the yoke comprises a two-way yoke, a three-way yoke, or a four-way yoke.

13. The electrical connector assembly of claim 11, wherein each of the first outwardly extending portion and the second outwardly extending portion further comprise a spade portion for connecting to the first and second power cables, respectively.

14. The electrical connector assembly of claim 13, further comprising first and second crimp connectors coupled to the first and second power cables, respectively, and wherein the first and second crimp connectors are configured for securing to the spade portions of the first and second outwardly extending portions, respectively.

15. The electrical connector assembly of claim 11, further comprising a first cable receptacle for providing an interface between the first outwardly extending portion and the first power cable, and a second cable receptacle for providing an interface between the second outwardly extending portion and the second power cable, wherein the first and second cable receptacles are configured for engagement with the outer housing of the yoke.

16. The electrical connector assembly of claim 11, wherein the ground rod is mated with the contact of the port by way of a female thread of the contact and a corresponding threaded male protrusion of the ground rod.

17. The electrical connector assembly of claim 11, wherein the ground rod further comprises a rounded ball end on the outwardly extending portion of the ground rod which extends from the outer housing of the yoke for attachment to a ball type grounding clamp.

18. The electrical connector assembly of claim 11, wherein the grounding device used for attachment to the ground rod is a bar type grounding clamp.

19. The electrical connector assembly of claim 11, wherein the permanent ground point further comprises a removable ground rod cap which is shaped to precisely fit over the permanent ground point to fully cover the permanent ground point when the electrical connector assembly and connected power cables are energized and which can be removed from the permanent ground point when the electrical connector assembly and connected power cables need to be grounded and serviced.

20. A method for grounding an electrical connector assembly, the method comprising:
providing an electrical connector having an outwardly extending portion comprised of a permanent ground point conductively connected to a yoke of the electrical connector;
de-energizing the electrical connector assembly and any equipment conductively coupled to the electrical connector assembly;
removing a removable ground rod cap which is shaped to precisely fit over a ground rod conductor extending outwardly from the electrical connector forming the permanent ground point to fully cover the permanent ground point;
connecting a grounding device, which is also connected to system ground, to the outwardly extending conductor of the permanent ground point to safely ground the electrical connector assembly;
performing service on equipment conductively coupled to the electrical connector assembly;
disconnecting the grounding device from the ground rod conductor of the permanent ground point;
re-installing the removable ground rod cap over the ground rod conductor of the permanent ground point; and
re-energizing the electrical connector assembly and any equipment conductively coupled to the electrical connector assembly.

\* \* \* \* \*